No. 841,840.
PATENTED JAN. 22, 1907.
F. W. ZASTROW.
CULTIVATOR.
APPLICATION FILED APR. 24, 1906.
2 SHEETS—SHEET 1.
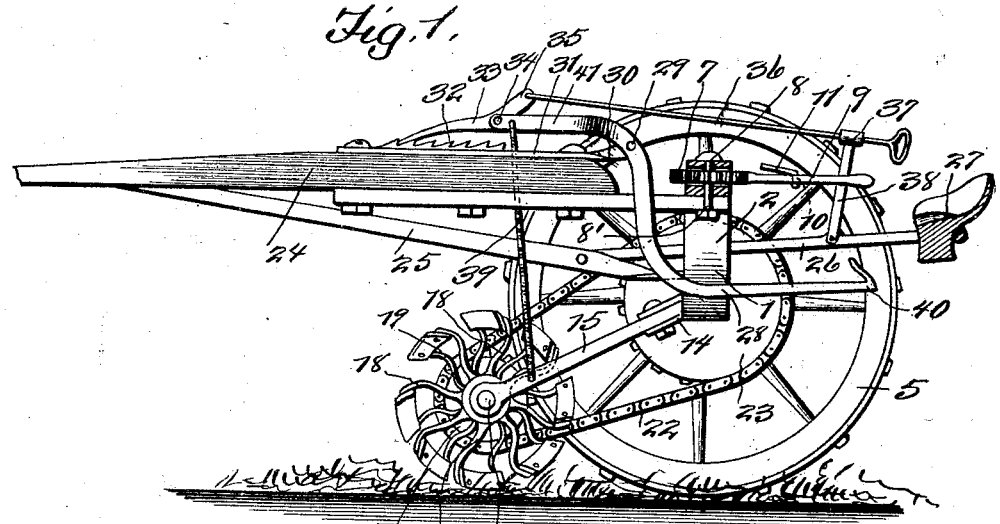
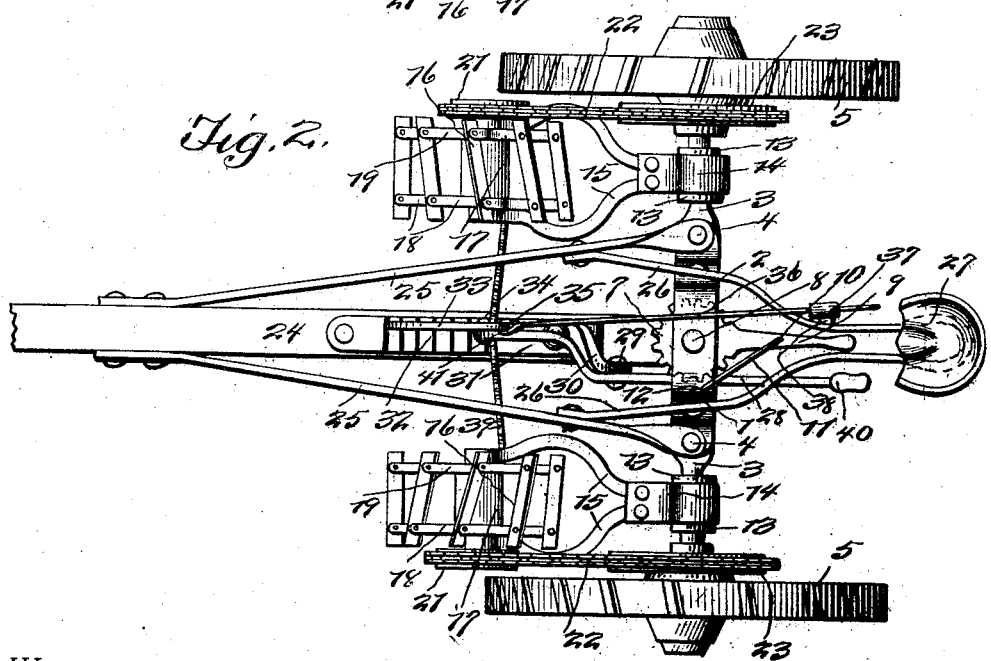
WITNESSES:
P. A. Boswell
K. G. Whitcomb
INVENTOR
F. W. Zastrow
BY
Swift & Co.
Attorneys

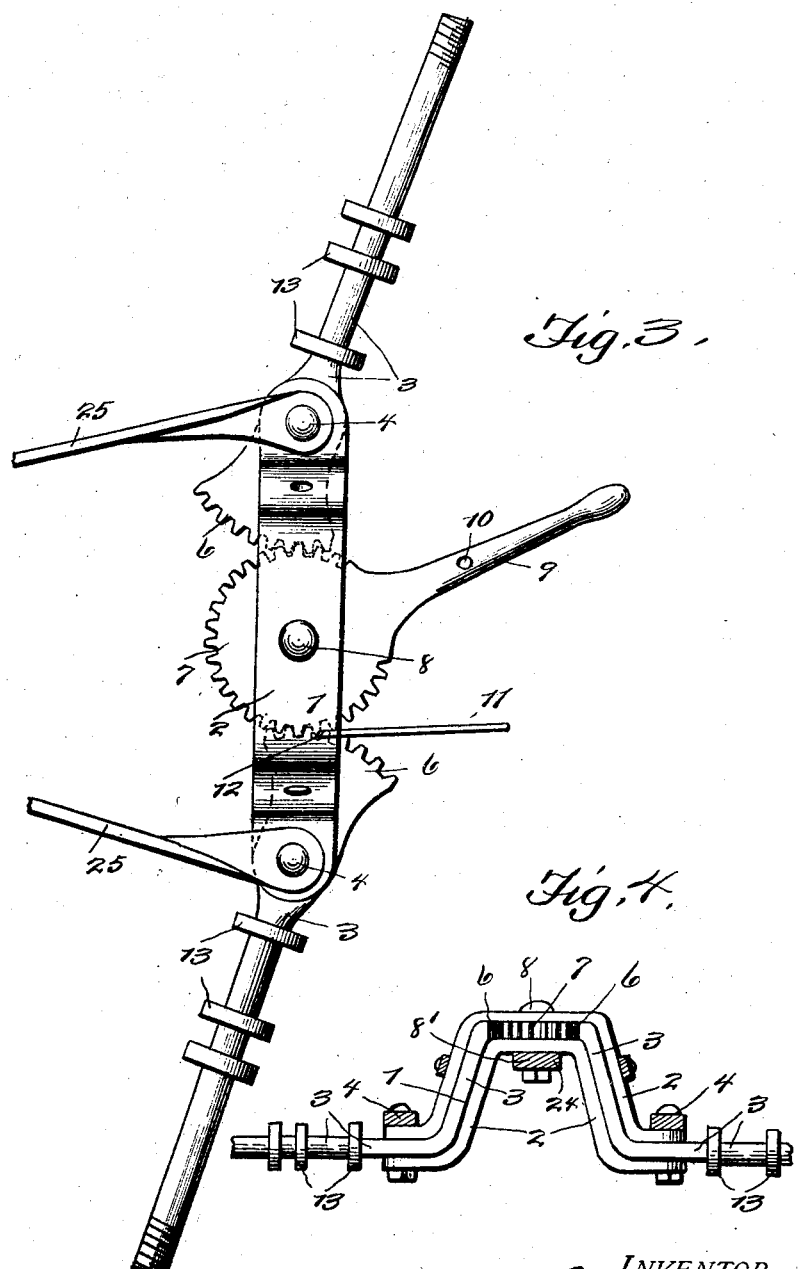

ured with wheels 5, upon which the machine is supported.

UNITED STATES PATENT OFFICE.

FRIEDRICH W. ZASTROW, OF CLARION, IOWA.

CULTIVATOR.

No. 841,840. Specification of Letters Patent. Patented Jan. 22, 1907.

Application filed April 24, 1906. Serial No. 313,494.

*To all whom it may concern:*

Be it known that I, FRIEDRICH W. ZASTROW, a citizen of the United States, residing at Clarion, in the county of Wright and State of Iowa, have invented a new and useful Cultivator; and I do hereby declare the following to be a full, clear, and exact description of the invention, such as will enable others skilled in the art to which it appertains to make and use the same.

This invention has relation to certain new and useful improvements in machines for cultivating corn, beans, and potatoes or any other crop which grows in rows; but it is not to be limited to any special kind of growing crop.

The most essential object of the invention is to provide a device of this particular character which will partly work the soil in such a manner as to produce a comparatively even surface.

Another object of the invention is to provide rotary cylinders composed of spiders which are journaled upon shafts and have the radial arms thereof connected by cutting-knives which are disposed upon an angle so as to produce a shearing action upon the earth.

Another object of my invention is to compose the axle thereof into two horizontal oscillating sections which have gear connections with a lever-controlled pinion and by the movement of which the wheel of the machine may be thrown quickly around, so as to steer the machine in one direction or the other, as desired.

This invention comprises further objects and combinations of elements, which will be hereinafter more fully described, and shown in the accompanying drawings, and the novel features thereof will be pointed out by the appended claims.

To obtain a full and correct understanding of the details of construction and combinations of features, elements, and advantages, reference is to be had to the hereinafter-set-forth description and accompanying drawings in connection therewith, wherein—

Figure 1 is a longitudinal section through the machine. Fig. 2 is a top plan view of the machine. Fig. 3 is a detail view of the steering mechanism leaving off the wheels, the connection of tongue, and the framing of the rotary cylinders. Fig. 4 is a rear view of the steering mechanism.

Making renewed reference to the accompanying drawings, wherein similar reference characters indicate the corresponding parts in the several illustrations by figures, 1 designates the axle, which comprises a framing 2 for the two horizontal oscillating axle-sections 3, which are pivoted between the framing 2, as at 4. The outer free ends of the axle-sections are provided with wheels 5, upon which the machine is supported.

The adjacent ends of the axle-sections are provided with gear-segments 6, which mesh with a lever-controlled pinion 7, which is pivoted between the framing, as at 8, and by the movement of the lever 9 of the said pinion in one direction or the other the wheels carried by the axle-sections will be thrown quickly around, which will of course steer the machine in the desired direction. To hold the lever 9 directly at right angles to the axle, so as to prevent the wheel from turning, the said lever is apertured, as at 10, to receive the angled end of a link 11, which is pivoted at 12 to the framing, as clearly shown in Fig. 2 of the drawings.

Pivoted upon the axle-sections between enlargements 13 are the clips 14, to which the frames 15 of the rotary cylinders 16 are connected. These clips carrying the frames 15 are pivoted between the enlargements for the purpose of allowing the rotary cylinders to swing vertically. These rotary cylinders comprise shafts 17, which are journaled in the frames 15 and have forged therewith the spiders 18, the radial arms 19 of each spider being out of alinement with one another, so as to dispose the cutting-knives which are connected therewith at such an angle as to produce a shearing action upon the soil, so as to expeditiously facilitate the work of the machine to a much greater advantage and to also throw soil toward the row of crop.

Upon the outer end of each shaft of the cylinders is mounted a sprocket 21, over which a sprocket-chain 22 travels, and which chain also travels over sprockets 23, which are fixed to the hubs of the supporting-wheels 5, which wheels when rotated operate the rotary cylinder, as will be clearly understood from the above description with connection to the drawings. The tongue 24 is connected to the framing 2, as at 8', and is braced by the brace-bars 25 and the rearwardly-extending brace-bars 26, to which the seat 27 is fixed, as clearly shown in the drawings.

The rear ends of the brace-bars 25 are connected to the pivots 4 of the axle-sections, as shown in the drawings. To facilitate the raising of the rotary cylinders, a foot-lever 28 is provided, which is pivoted at 29 to a projecting portion 30 of a plate 31, which is bolted or otherwise secured to the tongue of the machine, as shown in Fig. 1 of the drawings. Formed with the plate 31 are ratchet-teeth 32 to be engaged by the elongated dog 33, which is pivoted at 34 to the foot-lever 28 and is provided with a rearwardly-projecting portion 35, which is connected to an operating-rod 36, which has a bearing in a tubular portion 37 of a lever 38, which is pivoted to the rearwardly-extending brace-bar 26. Attached to the frame 15 of the rotary cylinders are chains or cables 39, which also are connected to the foot-lever 28.

When pressure is applied upon the end 40 of the foot-lever, causing the opposite end 41 to rise, thereby also raising the rotary cylinders, and by such movement of the foot-lever the elongated dog is brought into action by coöperating with the ratchet-teeth, which will hold the rotary cylinders in raised position, as clearly understood from the above description in connection with the drawings.

Having thus fully described my invention, what is claimed as new and useful by the protection of Letters Patent is—

1. A cultivator, having a frame and axle, supporting-wheels mounted on said axles, said wheels also having sprocket-wheels, frames pivotally mounted on said axles and having rotary cutters mounted in their lower ends, said rotary cutters having sprocket-wheels, chains for rotating said cutters, and means for raising said pivotally-mounted frames, substantially as described.

2. A cultivator having a frame mounted on wheels, rotary cutters, mounted on a frame and having means for receiving motion from said first-named wheels, a lever having a lower portion adapted to be engaged by the foot for raising said cutters, a dog fulcrumed on the upper end of said lever, and adapted to engage ratchet-teeth, and a horizontally-disposed hand-operated rod, for releasing said dog.

3. A cultivator having a U-shaped axle, with wheels mounted thereon, said wheels being adapted to actuate rotary cutters, a lever for raising and lowering said cutters and having a dog mounted on the upper end thereof, a ratchet-plate adapted to be engaged by said dog, said lever having a downturned portion, and a horizontal portion passing under the said U-shaped portion of the axles and adapted to be engaged by the foot, and a rod for releasing said dog.

In testimony whereof I have hereto affixed my signature in the presence of two witnesses.

FRIEDRICH W. ZASTROW.

Witnesses:
W W. SHEPLEE.
E. A. ALEXANDER.